(12) United States Patent
Harper et al.

(10) Patent No.: US 6,476,817 B1
(45) Date of Patent: Nov. 5, 2002

(54) REMOVABLE MEDIA, SUCH AS A FLOPPY DISK OR VIDEOCASSETTE, HAVING ASSOCIATED DISPLAY

(75) Inventors: Richard H. Harper, Marlborough (GB); Michael G. Molloy, Caldecote (GB); Marc B. Rene, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/324,593

(22) Filed: Jun. 3, 1999

(51) Int. Cl.[7] .................................................. G06T 1/60
(52) U.S. Cl. ........................ 345/530; 345/684; 345/2; 360/131; 360/133
(58) Field of Search .................... 345/530, 50, 684, 345/685, 686, 24; 360/131, 133, 132

(56) References Cited

U.S. PATENT DOCUMENTS

| 4,689,708 A | * | 8/1987 | Oishi et al. ................. 360/133 |
| 5,389,945 A | | 2/1995 | Sheridon ..................... 345/85 |
| 5,485,560 A | * | 1/1996 | Ishida et al. ................ 395/133 |
| 5,708,525 A | | 1/1998 | Sheridon ..................... 359/296 |
| 5,745,102 A | | 4/1998 | Bloch et al. ................. 345/185 |
| 5,754,332 A | * | 5/1998 | Crowley ..................... 359/296 |
| 5,922,268 A | * | 7/1999 | Sheridon ..................... 264/437 |

* cited by examiner

*Primary Examiner*—Mark Zimmerman
*Assistant Examiner*—Mackly Monestime
(74) *Attorney, Agent, or Firm*—R. Hutter

(57) ABSTRACT

A removable memory media, such as a floppy disk or videocassette, has an electrically alterable display thereon. The display comprises an array of electrically alterable elements which can be selectably altered in appearance without the need for ancillary circuitry on the floppy disk or videocassette.

12 Claims, 3 Drawing Sheets

REMOVABLE MEDIA, SUCH AS A FLOPPY DISK OR VIDEOCASSETTE, HAVING ASSOCIATED DISPLAY

INCORPORATION BY REFERENCE

U.S. Pat. No. 5,389,945, assigned to the assignee hereof, is hereby incorporated by reference.

FIELD OF THE INVENTION

The present invention relates to removable data storage media as used with, for example, computers and other data-processing devices, such as floppy disks. In particular, the present invention relates to a system whereby such removable media can be automatically labeled for visual identification thereof.

BACKGROUND OF THE INVENTION

Removable data storage media, such as floppy disks, are well known in the computer industry. A single floppy disk may have loaded thereon data which varies with every use of the floppy disk. It is often desirable to reuse floppy disks after the data that had once been placed therein is no longer needed, so that digital data on a particular disk is often overwritten with completely different and unrelated data in a subsequent use of the disk.

A common practical problem in environments where removable media such as floppy disks are in widespread use is that it is inconvenient for users to label and re-label various floppy disks with information relating to the data stored on the floppy disk at any particular time. Labeling a floppy disk in the first instance is often inconvenient to begin with, and subsequent crossing out or erasing of any written label on a floppy disk is merely an opportunity for confusion.

The present invention relates to a design of a floppy disk (or other type of removable data storage media) which enables automatic visual labeling of the media as it is used.

DESCRIPTION OF THE PRIOR ART

U.S. Pat. No. 5,745,102 discloses an electro-optical display for a digital data storage device, such as a floppy disk. The apparatus utilizes a modified floppy disk housing and a modified floppy disk drive to automatically label the floppy disk with file names being copied to or deleted from the disk. Disposed on the floppy disk housing is an electronic display such as an LCD display, as well as a receiving device for receiving digital data, and a logic/memory device coupled to the receiving device and the display. While the disclosure in this patent represents a floppy disk or other media with an electrically-alterable display, the rather sophisticated arrangement of a processor and an LCD display on a floppy disk will represent a serious cost disadvantage to each floppy disk.

U.S. Pat. Nos. 5,389,945 and 5,708,525, assigned to the assignee hereof, are examples of patents which disclose an "electric paper" concept. In the particular embodiments shown in these patents, a substrate has embedded therein a two-dimensional arrangement of "bichromal balls," each ball having essentially a white hemisphere and a black hemisphere, and each ball being rotatable within the substrate. By external electrostatic or magnetic manipulation of the balls within the substrate, individual bichromal balls can be oriented to have their black hemisphere or their white hemisphere oriented in a particular direction. By selectively orienting various balls in the two-dimensional array, the black hemispheres of certain balls can be oriented such that the hemispheres can collectively form alphanumeric characters. Significantly, the electrical, electrostatic or electromagnetic devices which selectably orient the bichromal balls within the substrate are external to the substrate itself.

Another technology similar in concept to "electric paper" is being developed by E Ink of Cambridge, Mass. In the E Ink concept, small transparent spheres filled with dark blue fluid and white particles are sandwiched between pieces of clear film. Electrical currents applied to the film control the movements of the particles within the spheres, pushing them up or drawing them down. A description of the E Ink concept is given in the article "Firm Turns a Page in Designing Prototype Flexible Display," San Jose Mercury News, Jul. 20, 1998.

SUMMARY OF THE INVENTION

According to one aspect of the present invention, there is provided a removable memory media, comprising a member for retaining data, and a casing associated with the member. An electrically alterable display is attached to the casing, the electrically alterable display being alterable through means which are not attached to the casing.

According to another aspect of the present invention, there is provided a data processing device, comprising a port for accepting a removable memory media. The memory media includes a member for retaining data, a casing associated with the member, and an electrically alterable display attached to the casing, the electrically alterable display being alterable through means which are not attached to the casing. The data processing device interacts with the member for retaining data while the computer memory media is disposed in the port. Means are provided for altering the electrically alterable display while the computer memory media is disposed in the port.

DETAILED DESCRIPTION OF THE INVENTION

Figure 1:
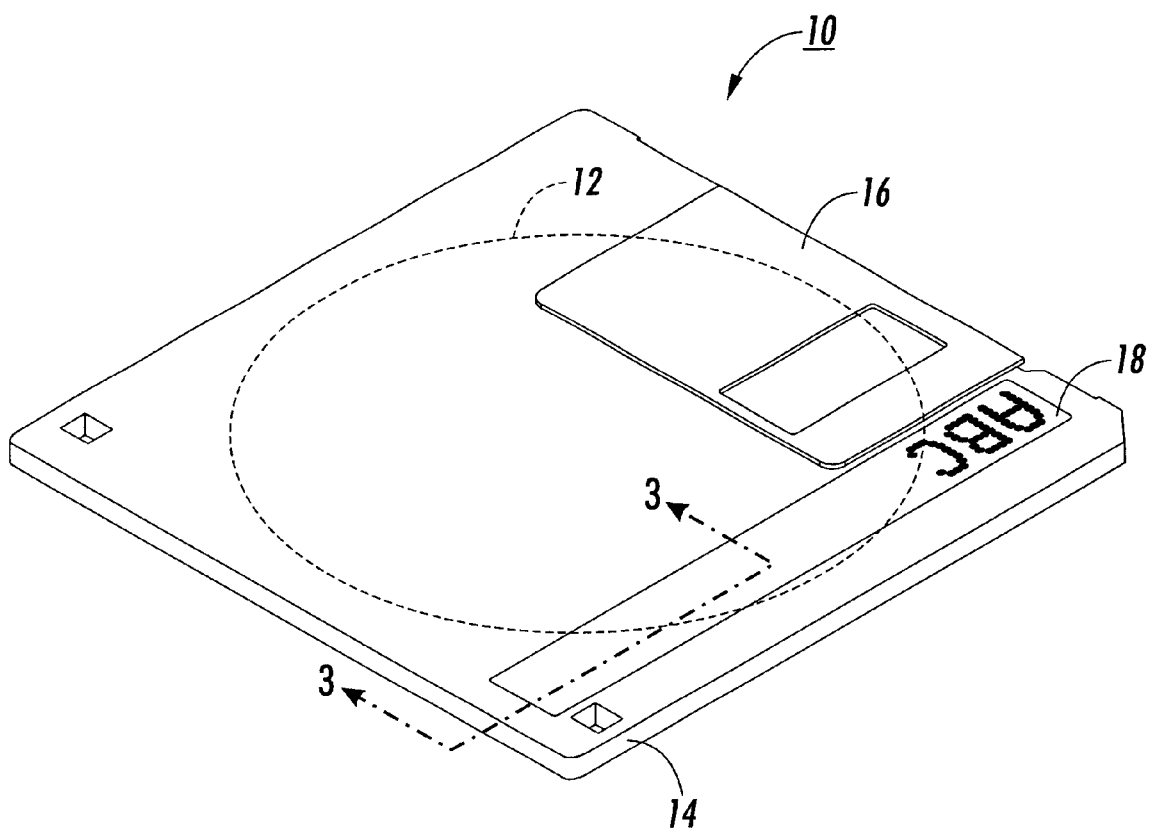
FIG. 1 shows a removable computer memory media, in the form of a floppy disk, incorporating the present invention.

FIG. 1 shows a removable computer media, in this particular case a floppy disk 10, incorporating an electrically alterable display according to the present invention. In a typical design of the well-known floppy disk 10, a magnetically permeable plastic disk (shown in phantom as 12) is disposed within a plastic casing generally indicated as 14. The disk 12 is rotatable within casing 14. As is well known, the casing 14 may include thereon a slidable cover 16.

With particular reference to the present invention, there is also provided, on an outer surface of casing 14, a display indicated as 18. Display 18 is preferably of such a size to accommodate a reasonable number of alphanumeric characters which may appear on the display. These alphanumeric characters are used to label the floppy disk 10 with particular identifying data. Display 18 thus serves as an electrically alterable display or label attached to the casing 14 of floppy disk 10.

With specific reference to the claims herein, the display 18 is an electrically alterable display which is alterable through means which are not attached to the casing. Specifically, display 18 is of such a construction that the application of what is here called electrical energy (but which term can also include magnetic, electromagnetic, or electrostatic energy) can be used to alter information which is visible on display 18. In a preferred embodiment of the present invention, as will be described in detail below, display 18 comprises a two-dimensional array of bichromal balls, which are addressable and manipulable through a magnetic or electrostatic head.

An important practical advantage of the display 18 according to the present invention is that the display is alterable through means which are not attached to the casing. This feature distinguishes the invention from an arrangement such as shown in, for example, U.S. Pat. No. 5,745,102. In the '102 patent, an electrically-alterable display is in the form of an LCD display; however, this LCD display is directly controlled by a "logic/memory device", that is a semiconductor chip, which is also on board the floppy disk and which controls the LCD display. Further in the '102 patent, the logic/memory device must be associated with a set of electrical contacts. As floppy disks and other removable media tend to be mass-produced commodity objects, the inclusion of an LCD display copper contacts, and a semiconductor chip on each floppy disk will significantly increase the manufacturing cost of such a floppy disk. Preferably, according to the present invention, there is no ancillary circuitry associated with the display 18: any electrical devices which serve to alter the information displayed on display 18 would be placed external to the floppy disk 10 such as within a computer or other data-processing device (such as a digital printer, bar code scanner, infrared or radio receiver, etc.)

Figure 2:
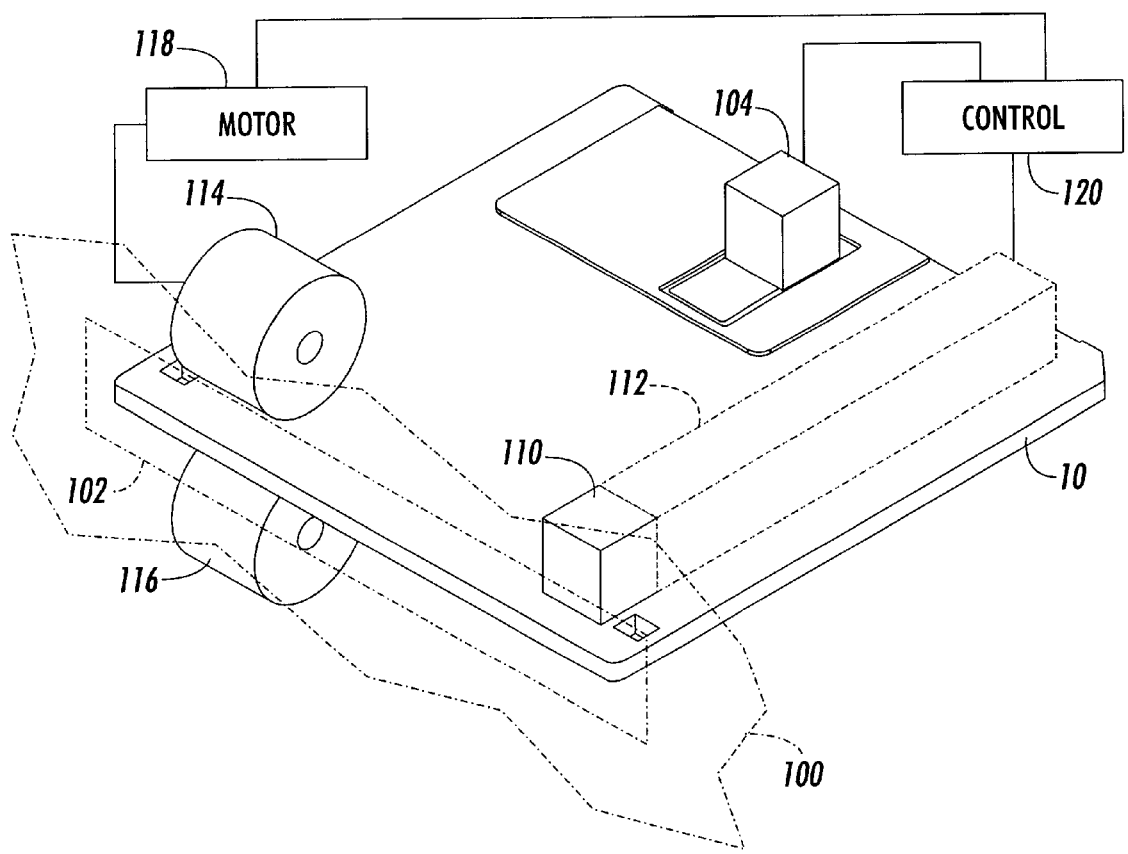
FIG. 2 is a perspective view of a floppy disk inserted into the port of a computer, according to the present invention.

FIG. 2 is a view showing a floppy disk 10 according to the present invention removably disposed within a computer 100, a portion of which is shown in phantom in the figure. As is typical in the art of office equipment, the floppy disk 10 is inserted for use in a port 102 on an exterior surface of the computer 100. As is further well-known in the art, once the floppy disk 10 is inserted in a port 102, the slideable cover 16 is moved by internal hardware (not shown) and the disk 12 (such as shown in FIG. 1) is accessed through an opening in the casing 14 for exposure to a magnetic read head shown in FIG. 2 as 104. The magnetic read head 104 is suitable for writing or reading digital data onto the disk 12, which forms a member for retaining data.

As shown in FIG. 2, in addition to the typical magnetic read head 104 which accesses the disk 12 inside floppy disk 10, there is provided what is here called simply a "head" 110. Depending on the particular design of the display 18 on floppy disk 10, head 110 could be an electromagnetic head, or an electrostatic head. What is important about head 110 is that it includes means for selectably charging or magnetizing addressable small areas within the main surface of display 18 when a floppy disk 10 is inserted in port 102. As will be described in detail below, particular electrostatic charging or magnetization of different small areas within display 18 will cause the areas to turn black (or some other color) to form the desired alphanumeric characters. Such addressable heads, of the magnetic or electrostatic variety, are well known.

As shown in FIG. 2, the head 110 could be relatively small, or, as shown in phantom as 112, could be large enough to essentially cover the entire area of the display 18. A large head such as indicated as 112 would be capable of selectably charging/magnetizing the small areas in display 18, thus creating the alphanumeric characters, while the floppy disk 10 is entirely disposed within the port 102. A smaller head 110, which may be preferable from a cost standpoint, would be disposed to cover only a relatively small portion of the entire display 18, but would selectably charge/magnetize different areas of display 18 as the floppy disk 10 moves past the head 110, such as when the floppy disk 10 is being removed from port 102. If the small head 110 is being used, which places the desired charge or magnetization on a series of small areas in display 18 as the floppy disk 10 moves, it may be desirable to ensure that the floppy disk 10 is moving at a constant velocity as it is expelled from port 102. To provide such a constant velocity to floppy disk 10, it may be desirable to provide one or more rollers such as 114, 116, associated with a constant-velocity motor here indicated schematically as 118. Again, any expense saved in providing a smaller head 110 may have to be weighed against the necessity of providing a motor 118.

In a preferred embodiment of the present invention, it is desired to place alphanumeric characters on display 18 which relate to the data stored on plastic disk 12 at any particular time. The perfect time to charge or magnetize the display 18 to display certain alphanumeric characters is when the floppy disk is expelled from port 102 immediately following a use in computer 100. There is thus provided, according to the present invention, a control indicated as 120, which may be formed in software associated with the general purpose processor within computer 100. According to a preferred embodiment of the present invention, the control 120 can read a given title to data on floppy disk 10 and read through read head 104, or could drive data from the standard "directory data" which is typically generated in floppy disk formats. From this title data or directory data, control 120 can derive a set of alphanumeric characters which could meaningfully fit on display 18. Control 120 can then cause this "label data" derived from the title or directory data to head 110 or 112, particularly at shut down or ejection of floppy disk 10 from port 102. Thus, according to the present invention, every time the floppy disk 10 is expelled from port 102, it will be effectively labeled or re-labeled with suitable title data which identifies the data on the floppy disk 10.

Figure 3:
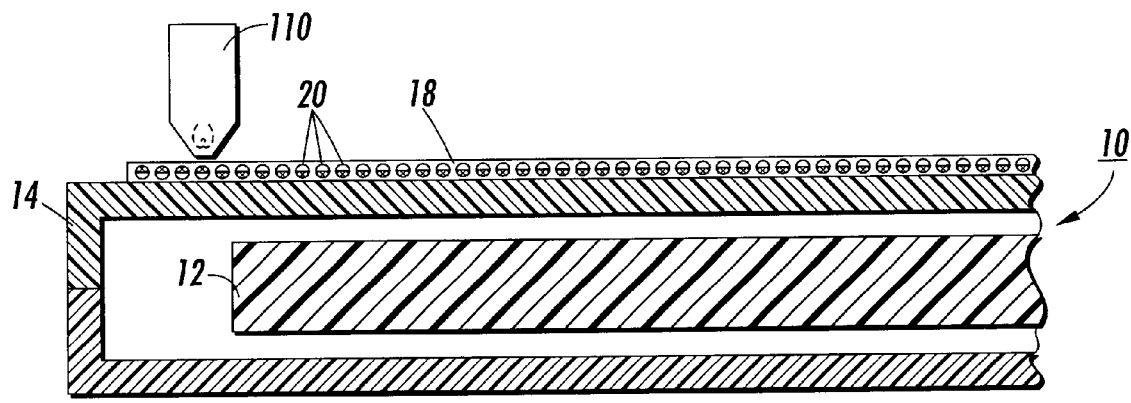
FIG. 3 is a sectional view through line 3—3 of FIG. 1, showing a detail of a floppy disk according to the present invention.

According to a preferred embodiment of the present invention, the display 18 comprises a two-dimensional array of bichromal balls, such as described in the patent incorporated by reference above. The advantage of the bichromal balls or "electric paper" system is that such a display can be re-written upon essentially limitlessly. FIG. 3 is a sectional view through line 3—3 of FIG. 1, showing the interaction of a head 110 (which could be a magnetic or electrostatic head) with a line of bichromal balls, each here identified as 20, within the display 18. As described in detail in the patent incorporated by reference, the individual bichromal balls 20 are rotatably disposed within the light-transmissive substrate forming the bulk of display 18. By suitably charging or otherwise energizing head 110 as successive individual bichromal balls 20 pass thereunder, the head 110 can selectably cause individual bichromal balls 20 to "turn black" (that is, have their black hemispheres turn upward in the view of the figure), thereby creating a small black area on the main surface of display 18.

With reference to the claims herein, each bichromal ball 20 in display 18 can be generally considered a "visible element." Each such visible element could be in a first state (such as white) or a second state (such as black) depending on an electrically-alterable condition of the visible element (that is, depending on its electrostatic charge or magnetic pole, either the black side or the white side of the ball will face upward). It will be apparent that the E Ink concept, as generally described in the references above, can similarly be generalized as comprising such visible elements. It will further be appreciated that such visible elements, as recited in the claims, could be largely mechanical, or micro-mechanical devices, or could indeed function at a purely molecular or chemical level.

Although only one row of bichromal balls 20 is shown in FIG. 3, it will be apparent that a two-dimensional array of such bichromal balls 20 in display 18 could interact with a linear array of addressable portions in head 110 thereby creating the desired alphanumeric characters as the floppy disk 10 moves past head 110 on its way out of port 102.

A practical consideration which must be taken into account when designing a system according to the present invention is to avoid electrical or magnetic interference between the display 18 and the memory media such as disk 12. If, for example, the head 110 manipulating display 18 has too-high electrical or magnetic output, such an output could inadvertently alter data on disk 12. Preferably, the power output of head 110, the location of display 18 on floppy disk 10, and the electromagnetic shielding properties of casing 14 (or a portion thereof) are chosen to avoid interference of data on disk 12 by the use of head 110.

Figure 4:
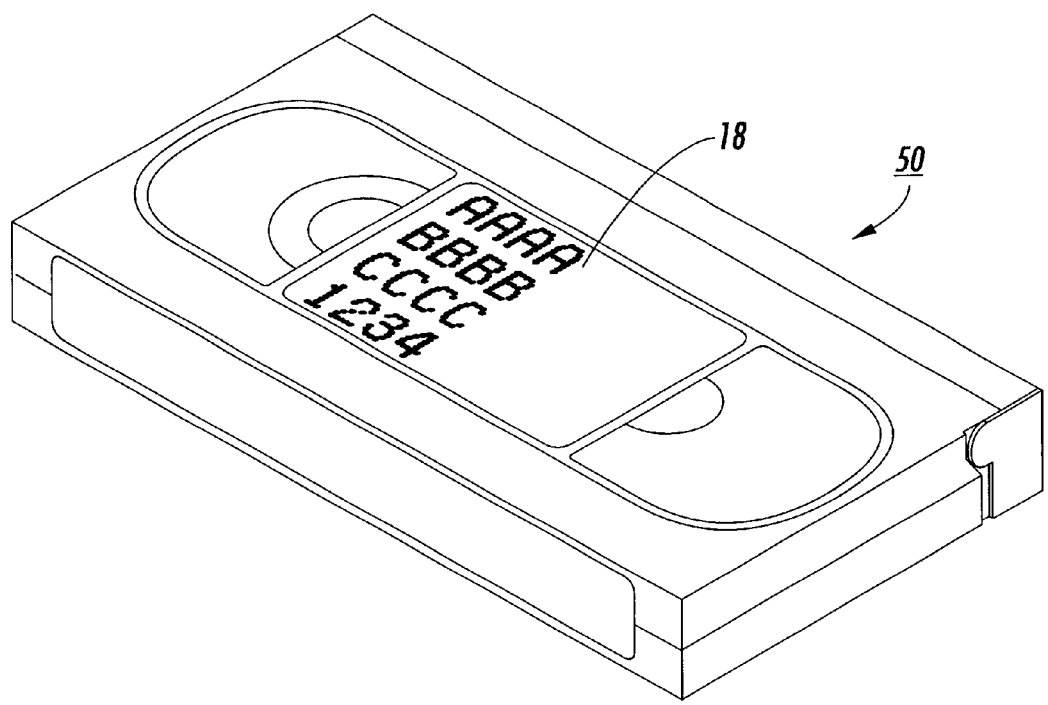
FIG. 4 shows a VHS-type video cassette, incorporating the present invention.

Although a floppy disk is shown as the FIG. 1 embodiment of the claimed invention, it will be apparent that the claimed invention can be used with any removable memory media which operates with a computer or other data-processing device. Indeed, a display according to the present invention can be incorporated with an audio or video cassette bearing analog or digital data. FIG. 4 is a perspective view of a VHS-type cassette, generally indicated as 50 (which, as is well known, includes a spool of magnetically-permeable tape therein), with a display 18 of a type described with reference to the floppy disk in FIG. 1. Of course, there is also be provided with such a video or audio cassette means for placing a message on the display as the cassette is released from the recorder, such means being incorporated with a video or audio recorder in the same manner as shown in FIG. 2 above (such a recorder being considered a "data processing device" for purposes of the claims below). In the case of a video cassette recorder, information about a program being recorded (such as program title and duration) could be gleaned from the teletext integral to television services; if several programs are recorded on one tape, the names of the programs can be listed in the order they appear on the tape. Other, ad-hoc information, such as the position of the tape in the cassette at the time the cassette was ejected, can be determined by a data processing device within the recorder. All this information can be written on the display 18.

When packaging a floppy disk or cassette (or sets thereof) incorporating the invention, it may be desirable to provide light-transmissive packaging, whereby a display such as 18 may be visible inside the packaging. The display can then be provided with a message thereon, such as describing the floppy disk as being DS/DD, or otherwise including a trademark, which becomes part of the total appearance of the packaged item.

What is claimed is:

1. A removable memory media, comprising:

a member for retaining data;

a casing associated with the member;

an electrically alterable display attached to the casing, the electrically alterable display being alterable through means which are not attached to the casing and wherein there is no circuitry attached to the casing.

2. The media of claim 1, the electrically-alterable display including a visible element, an appearance of the visible element being of a first state or a second state, depending on an electrically-alterable condition of the visible element.

3. The media of claim 2, the visible element including a bichromal ball.

4. The media of claim 2, the electrically alterable display comprising an arrangement of bichromal balls.

5. The media of claim 1, the member for retaining data being a magnetically-permeable disk.

6. The media of claim 1, the member for retaining data being magnetically-permeable tape.

7. A data processing device using a removable memory media, comprising:

a port for accepting a removable memory media, the computer memory media including a member for retaining data, a casing associated with the member, and an electrically-alterable display attached to the casing, the electrically-alterable display being alterable through means which are not attached to the casing and wherein there is no circuitry attached to the casing;

means for the data processing device to interact with the member for retaining data while the computer memory media is disposed in the port; and means for altering the electrically alterable display while the computer memory media is disposed in the port.

8. The device of claim 7, further comprising a magnetic head for altering the electrically alterable display.

9. The device of claim 7, further comprising an electrostatic head for altering the electrically alterable display.

10. The device of claim 7, further comprising:

means for deriving display data from data on the member for retaining data; and means for causing the electrically alterable display to display the display data.

11. The device of claim 7, the member for retaining data being a magnetically-permeable disk.

12. The device of claim 7 the member for retaining data being magnetically-permeable tape.

* * * * *